United States Patent [19]
Persson et al.

[11] Patent Number: 5,625,239
[45] Date of Patent: *Apr. 29, 1997

[54] METHOD AND APPARATUS FOR SENSING RELATIVE POSITION BETWEEN TWO RELATIVELY ROTATABLE MEMBERS USING CONCENTRIC RINGS

[75] Inventors: Erland K. Persson, Golden Valley, Minn.; Don Blandino, Sterling Heights, Mich.; Michael J. Boyer, Lake Orion, Mich.; Michael J. Medora, Sterling Heights, Mich.

[73] Assignee: TRW Inc., Lyndhurst, Ohio

[*] Notice: The term of this patent shall not extend beyond the expiration date of Pat. No. 5,406,155.

[21] Appl. No.: 329,206

[22] Filed: Oct. 26, 1994

Related U.S. Application Data

[63] Continuation-in-part of Ser. No. 893,090, Jun. 3, 1992, Pat. No. 5,406,155.
[51] Int. Cl.⁶ .................. H02K 11/00; H02K 17/42; G01B 7/14
[52] U.S. Cl. .............. 310/68 B; 310/171; 324/207.17; 324/207.25
[58] Field of Search .................. 310/68 B, 168, 310/171, 268; 318/638, 647, 652, 653, 701; 341/15, 16; 324/207.17, 207.25; 340/870.31, 870.32, 870.25; 346/45

[56] References Cited

U.S. PATENT DOCUMENTS

| | | | |
|---|---|---|---|
| 2,650,352 | 8/1953 | Childs | 340/870.31 |
| 3,099,830 | 7/1963 | Wayman | 341/15 |
| 4,223,300 | 9/1980 | Wiklund | 340/870.32 |
| 4,645,961 | 2/1987 | Malsky | 310/254 |
| 4,697,144 | 9/1987 | Howbrook | 324/207.23 |
| 4,743,786 | 5/1988 | Ichikawa et al. | 310/111 |
| 4,829,247 | 5/1989 | Wallrafen | 324/207.25 |
| 4,851,771 | 7/1989 | Ikeda et al. | 324/207.25 |
| 5,406,155 | 4/1995 | Persson | 310/68 B |

*Primary Examiner*—Clayton E. LaBalle
*Attorney, Agent, or Firm*—Tarolli, Sundheim, Covell, Tummino & Szabo

[57] ABSTRACT

An apparatus for sensing the relative rotational position between a stator (28) and a rotor (32) in a variable reluctance motor (26) includes a transmitting ring (40) mounted to the rotor (32) and having a transmitting coil (46) mounted thereon. A receiving ring (42) is mounted to stator (46) and has a receiving coil (56) mounted thereon. The receiving coil includes three conductor patterns (56a, 56b, 56c) having the same shape, each of said conductor patterns being electrically insulated from each other, and each conductor pattern being offset from adjacent conductor patterns by 120 electrical degrees. A drive signal is coupled to the transmitting coil. The apparatus further includes a controller (76) for monitoring the outputs from the receiving coil patterns and for determining the relative rotation between the rotor and the stator from the monitored outputs. The receiving coil patterns are each arranged in a circumferentially varying square wave pattern.

21 Claims, 5 Drawing Sheets

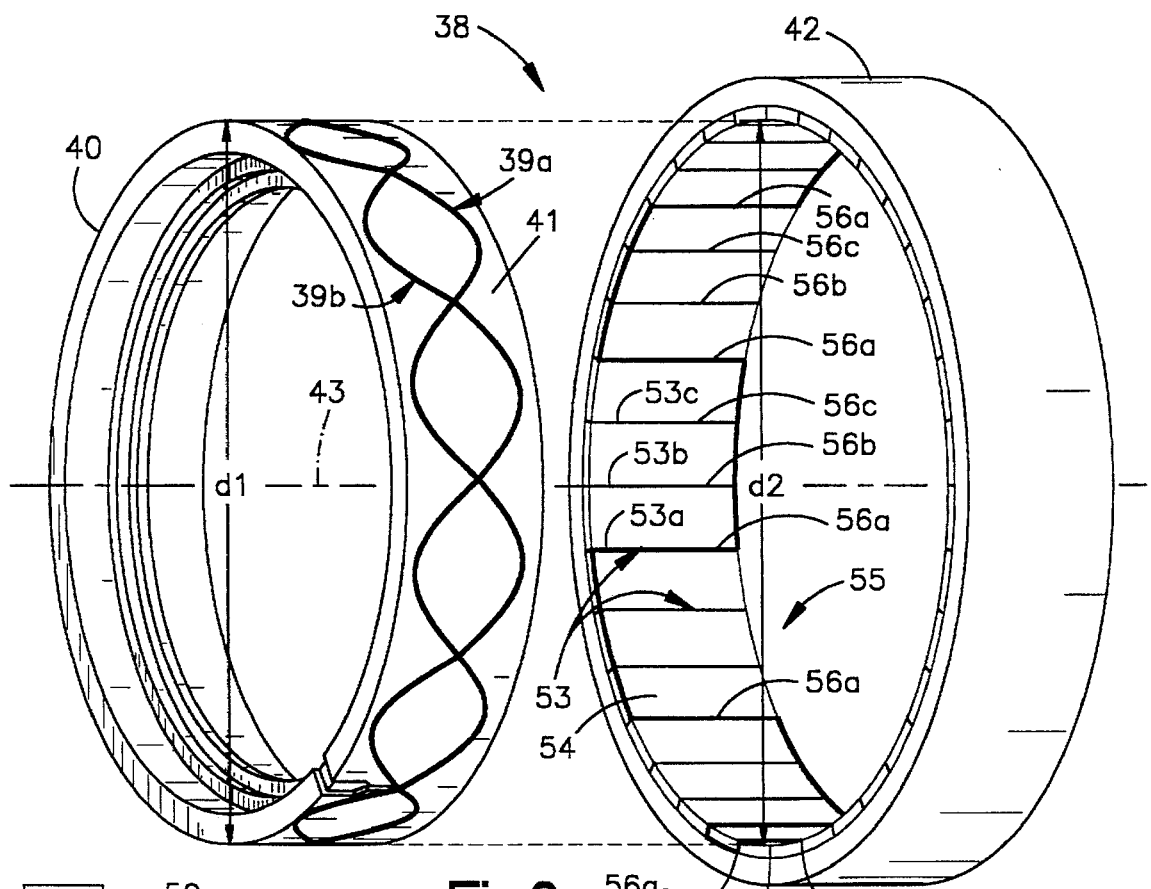
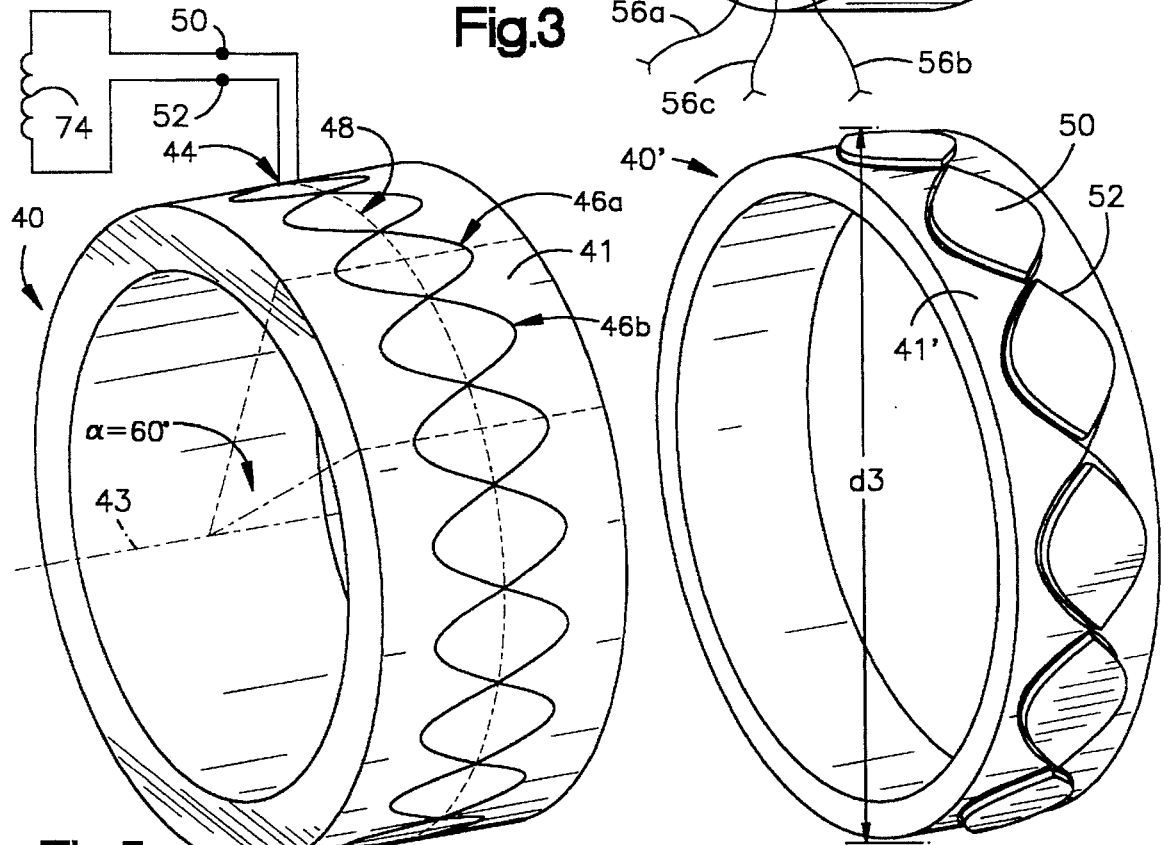
Fig.3
Fig.5
Fig.7

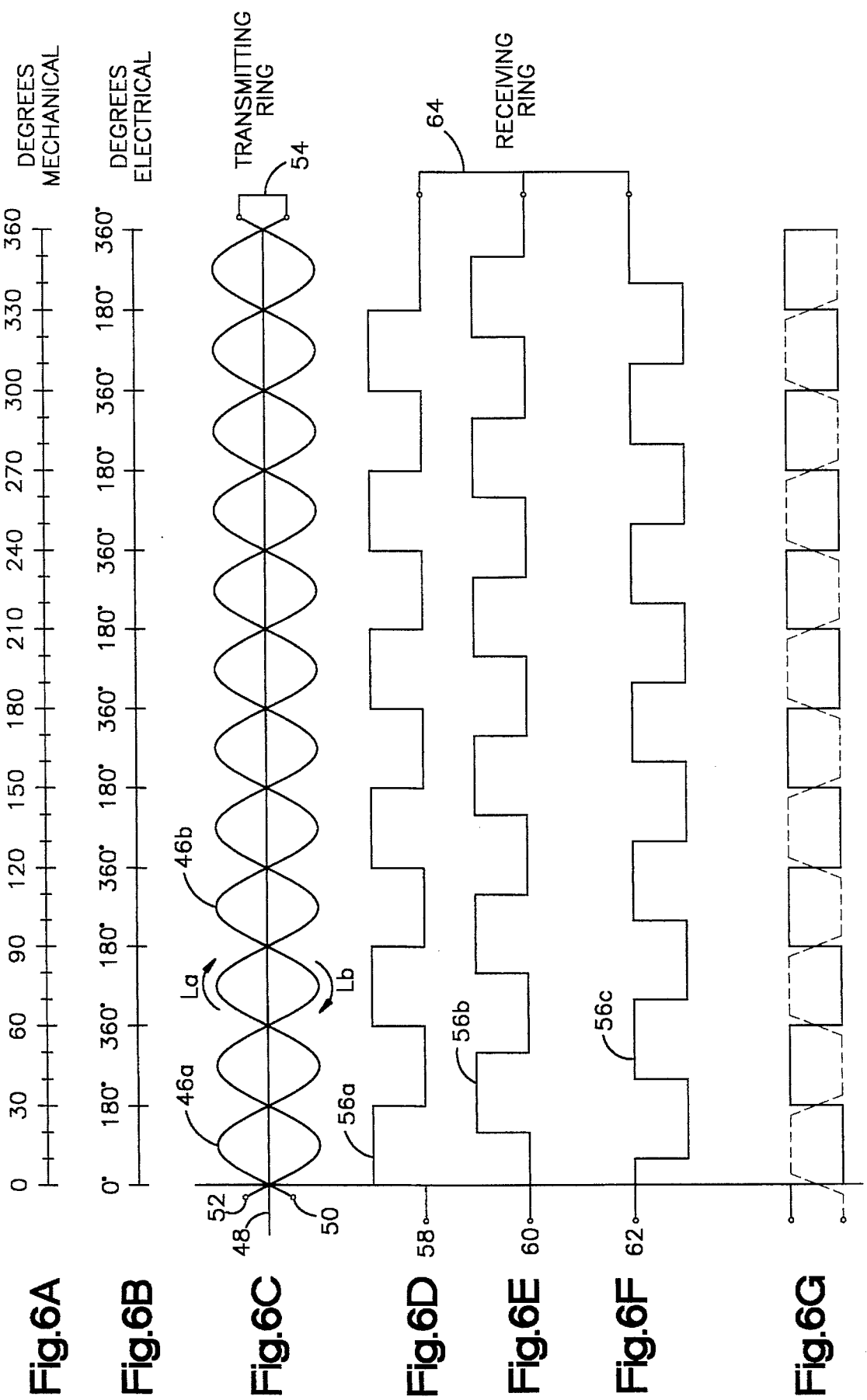

METHOD AND APPARATUS FOR SENSING RELATIVE POSITION BETWEEN TWO RELATIVELY ROTATABLE MEMBERS USING CONCENTRIC RINGS

CROSS-REFERENCE TO RELATED APPLICATION

This application is a continuation-in-part of U.S. Ser. No. 07/893,090, now U.S. Pat. No. 5,406,155 filed Jun. 3, 1992, to Persson entitled "METHOD AND APPARATUS FOR SENSING RELATIVE POSITION BETWEEN TWO RELATIVELY ROTATABLE MEMBERS" and assigned to TRW Inc.

TECHNICAL FIELD

The present invention is directed to a method and apparatus for sensing the relative rotational position between two relatively rotatable members. The invention has particular use for sensing the relative position between a rotor and stator in a variable reluctance motor of an electric assist steering system for vehicles.

BACKGROUND OF THE INVENTION

There are many known power assist steering systems for automotive vehicles. Some provide steering assist by using hydraulic power and others by using electric power.

Electric assist steering systems include an electric motor drivably connected to the steerable vehicle wheels. When energized, the electric motor assists the steering movement of the steerable wheels. The electric assist motor is controlled in response to steering torque applied to the steering wheel.

Known electric steering systems typically include a D.C. permanent magnet electric assist motor electrically energized through an H-bridge drive circuit. It is desirable to, instead, use a variable reluctance motor for an electric assist steering system because of its smaller size and larger torque-to-inertia ratio. Proper commutation of a variable reluctance motor requires a "knowledge" of the motor's rotor position relative to the stator.

Rotor position sensors for electric motors are known in the art. For example, U.S. Pat. No. 2,650,352 to Childs is directed to a system for measuring the motion between two relatively movable members (i.e., rotor and stator). The system comprises a rotor and a stator both made of a non-magnetic material to avoid magnetic coupling errors that arise in any ferromagnetic structure. In one embodiment, a conductor is threaded back and forth through accurately spaced slots around the periphery of the rotor, and likewise for the stator. The conductor patterns on both the rotor and stator form a plurality of series connected conductor bars disposed transverse to the direction of movement of the rotor. A radio frequency current is applied to the terminals of the conductor on the stator. The radio frequency current in the stator conductor induces a signal in the rotor conductor. The magnitude of the induced signal in the rotor conductor is a function of the relative position between the rotor and the stator. In this way, the system measures the relative position between the rotor and the stator.

SUMMARY OF THE INVENTION

The present invention provides a method and apparatus for sensing the relative rotational position between two relatively rotatable members and, in particular, between the rotor and stator of a Variable reluctance, electric assist steering motor.

In accordance with one embodiment of the present invention, an apparatus is provided for sensing the relative rotational position between first and second relatively rotatable members. The apparatus comprises a transmitting ring being mountable to the first member. The transmitting ring has a transmitting coil mounted thereon and arranged in a circumferentially varying sinusoidal pattern. The apparatus further comprises a receiving ring being mountable to the second member. The receiving ring has a receiving coil mounted thereon and arranged in a pattern so as to receive a signal from the transmitting ring and output a signal indicative of the relative rotational position between the first and second members.

In accordance with a preferred embodiment of the present invention, an apparatus is provided for sensing the relative rotational position between a stator and a rotor in a variable reluctance motor. The apparatus comprises a transmitting ring mounted to the rotor and having a transmitting coil mounted thereon. A receiving ring is mounted to stator and has a receiving coil mounted thereon. The receiving coil includes three conductor patterns having the same shape, each of the conductor patterns being electrically insulated from each other, and each conductor pattern being offset from adjacent conductor patterns by 120 electrical degrees. Means are provided for generating a drive signal and coupling the drive signal to the transmitting coil. The apparatus further includes means for monitoring the outputs from the receiving coil patterns and for determining the relative rotation between the rotor and the stator from the monitored outputs. The receiving coil patterns are each arranged in a circumferentially varying square wave pattern. The transmitting coil is a circumferentially varying Sinusoidal wave pattern that extends around the entire circumference of said transmitting ring and the receiving coil patterns extends around the entire circumference of said receiving ring.

In accordance with another embodiment of the present invention, a method for sensing the relative rotational position between first and second relatively rotatable members, comprising the steps of (a) providing a transmitting ring; (b) securing a transmitting coil to the transmitting ring in a circumferentially varying sinusoidal pattern; (c) mounting the transmitting ring to one of the first and second members; (d) providing a receiving ring; (e) securing a receiving Coil to the receiving ring in a pattern so as to receive a signal from the transmitting ring and output a signal indicative of the relative rotational position of the first and second members; and (f) mounting the receiving ring to the other of the first and second members.

BRIEF DESCRIPTION OF THE DRAWINGS

Other features and advantages of the present invention will become apparent to those skilled in the art to which the present invention relates from reading the following detailed description with reference to the accompanying drawings, in which:

FIG. 3 is an exploded oblique view of a transmitting ring and receiving ring of the rotor position sensor shown in FIG. 1;

FIG. 5 is an oblique view of the transmitting ring shown in FIG. 3 with the electrical conductor pattern thereon;

FIGS. 6A–6G are graphical representations of conductor patterns for both the transmitting and receiving rings relative to mechanical and electrical degree scales for the rotor position sensor shown in FIG. 1;

FIG. 7 is an alternative embodiment of a transmitting ring in accordance with the present invention;

DESCRIPTION OF THE PREFERRED EMBODIMENT

Figure 1:
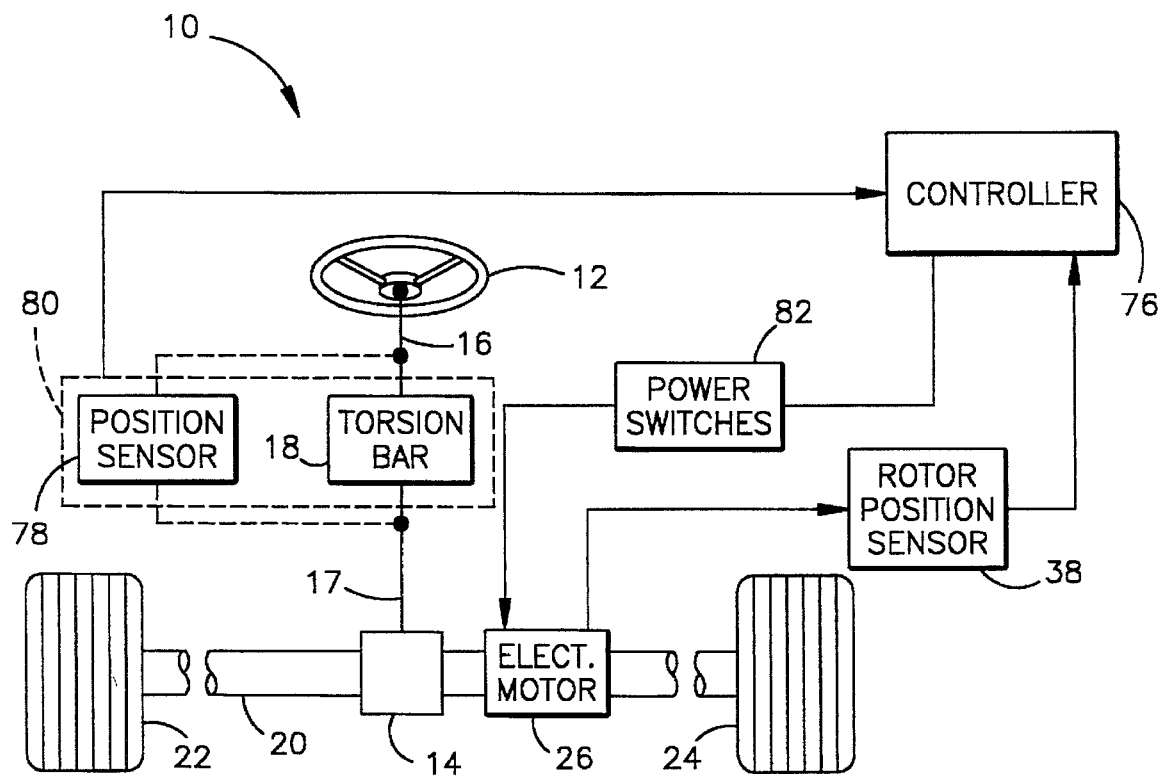
FIG. 1 is a schematic block diagram illustrating a power assist steering system having a rotor position sensor made in accordance with the present invention.

Referring to FIG. 1, a power assist steering system 10 includes a steering wheel 12 operatively connected to a pinion gear 14. Specifically, the vehicle steering wheel 12 is connected to an input shaft 16 and the pinion gear 14 is connected to an output shaft 17. The input shaft 16 is operatively coupled to the output shaft 17 through a torsion bar 18. The torsion bar 18 twists in response to applied steering torque thereby permitting relative rotation between the input shaft 16 and the output shaft 17. Stops, not shown, limit the amount of such relative rotation between the input and output shafts in a manner well known in the art.

The pinion gear 14 has helical teeth which are meshingly engaged with straight cut teeth on a rack or linear steering member 20. The pinion gear in combination with the straight cut gear teeth on the rack member form a rack and pinion gear set. The rack 20 is steerably coupled to the vehicle's steerable wheels 22, 24 with steering linkage in a known manner. When the steering wheel 12 is turned, the rack and pinion gear set converts the rotary motion of the steering wheel into linear motion of the rack. When the rack moves linearly, the steerable wheels 22, 24 pivot about their associated steering axes and the vehicle is steered.

An electric assist, variable reluctance motor 26 is drivingly connected to the rack 20. When the motor 26 is energized, it provides power assist steering so as to aid in the rotation of the vehicle steering wheel by the vehicle operator and, in turn, turning of the steerable wheels 22, 24. A variable reluctance motor is desirable for use in an electric assist steering system because of its small size, low friction, and its high torque-to-inertia ratio.

Figure 2:
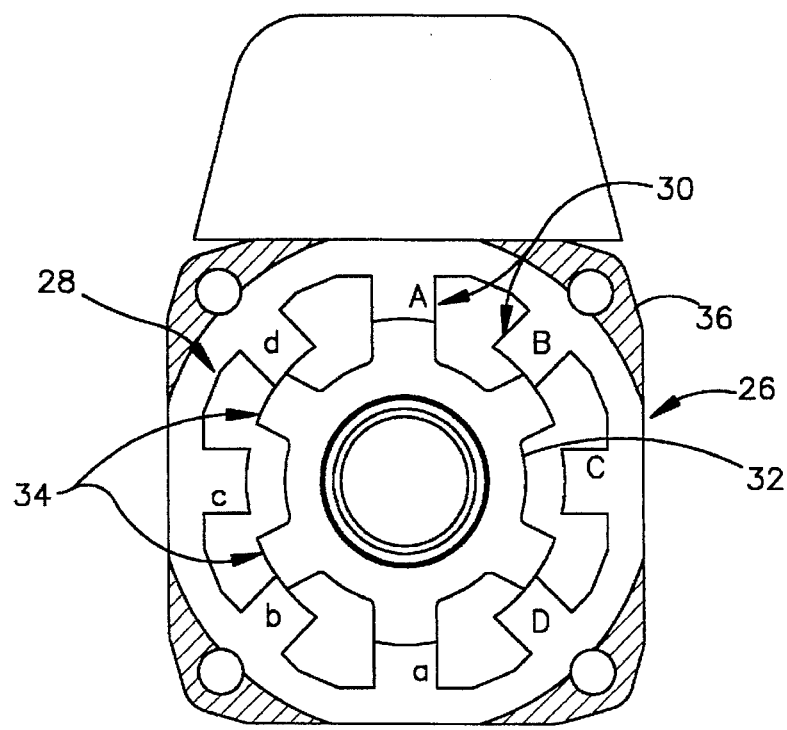
FIG. 2 is a cross-sectional view of the variable reluctance electric assist motor shown in FIG. 1.

FIG. 2 is a cross-sectional view of a variable reluctance motor in accordance with a preferred embodiment of the present invention. The variable reluctance motor 26 includes a stator 28 with eight stator poles 30 and a rotor 32 with six rotor poles 34. Each stator pole 30 has an associated stator coil (not shown). The stator poles are arranged so as to be energized in pairs designated Aa, Bb, Cc, and Dd thereby resulting in four stator pole pairs and six rotor poles 34. The motor 26 is mounted in a motor housing 36 so that the stator 28 is fixed relative to the housing 36.

The principle of operation of a variable reluctance motor is well known in the art. Basically, the stator poles are energized in pairs. Specifically, a current is provided to the stator coils associated with a given pair of stator poles. The rotor moves so as to minimize the reluctance between the stator poles and the rotor poles. Minimum reluctance occurs when a pair of rotor poles are aligned with the energized stator poles. Once minimum reluctance is achieved, i.e., when the rotor poles align with the energized stator poles, those energized stator poles are de-energized and an adjacent pair of stator poles are energized. The direction of motor rotation is controlled by the sequence in which the stator poles are energized. The torque produced by the motor is controlled by the current through the energized stator coils. A preferred manner for controlling a variable reluctance motor in an electric assist steering system is fully disclosed in U.S. Pat. No. 5,257,828, to Miller et al, entitled "METHOD AND APPARATUS FOR CONTROLLING DAMPING IN AN ELECTRIC ASSIST STEERING SYSTEM FOR VEHICLE YAW RATE CONTROL," assigned to TRW Inc., which is hereby fully incorporated herein by reference.

A rotor position sensor 38, made in accordance with the present invention, is operatively connected between the motor rotor 32 and to the motor stator 28 or housing 36. The stator 28 and motor housing 36 are relatively stationary. The function of the rotor position sensor 38 is to provide an electrical signal indicative of the position of the rotor 32 relative to the motor stator 28. For proper operation of the variable reluctance motor 26, including direction of rotation and applied torque, it is necessary to know the position of the rotor 32 relative to the stator 28.

Figure 4:
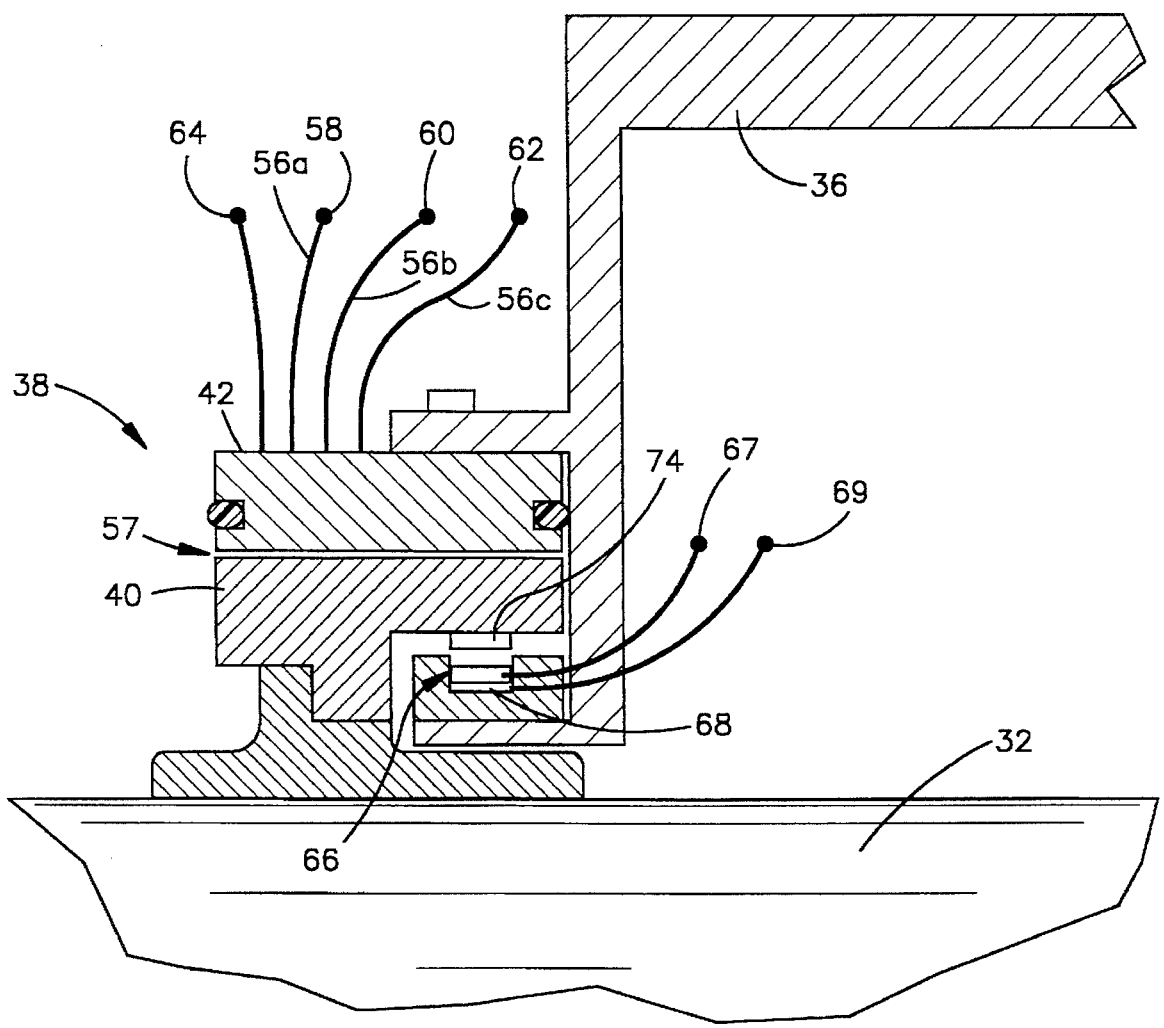
FIG. 4 is a side sectional view of a portion of the rotor position sensor shown in FIG. 1.

Referring to FIGS. 3–5, the rotor position sensor 38, made in accordance with the present invention, includes a transmitting ring 40 and a receiving ring 42. The rings shown in FIG. 3 are axially offset for clarity. In their assembled position, shown in FIG. 4, the rings are mounted so as to be concentric (nested) about a common axis 43. The rings 40, 42 are preferably made from a magnetically permeable material that will support magnetic flux in the 200 kHz frequency range. The permeability of such material preferably exceeds 10 at this frequency. Magnetically permeable materials that exhibit such characteristics include powdered iron, soft ferrites, and ferrite filled plastic. The magnetically permeable material provides a return path for the magnetic circuits associated with the transmitting and receiving rings. In addition, the magnetically permeable material provides filtering of EMF interference from outside sources, and even from the operation of the motor itself.

The transmitting ring 40 has an outer diameter d1. The receiving ring 42 has an inner diameter d2. The diameter d1 is less than the diameter d2 so that a relatively small air gap exists between the two rings when they are assembled in their concentric or nested arrangement.

The transmitting ring 40 is coaxially secured to the rotor 32. The transmitting ring 40 has two sinusoidal grooves 39a and 39b cut in its outer surface 41. The sinusoidal grooves 39a and 39b are 180 electrical degrees out of phase. The orientation of the grooves 39a and 39b are referred to as being a circumferentially varying sinusoidal pattern.

A transmitting coil 44 is disposed in the grooves 39a and 39b around the entire circumference of the ring 40. The transmitting coil 44 comprises two conductive electrical tracks 46a and 46b being disposed in the grooves 39a and 39b, respectively. The conductive electrical tracks 46a and 46b are electrically insulated from each other and from the ring 40. Preferably, the depth of the grooves 39a and 39b and the dimension of the conductors 46a and 46b are such that, once assembled, the conductors 46a and 46b are flush with the outer surface 41. Each conductive electrical track 46a and 46b is arranged in a circumferentially varying sinusoidal pattern, with a 180° relative offset between the two patterns. The sinusoidal patterns of the conductive electrical tracks 46a and 46b can be expressed by the following equations:

$$C_{46a} = D\sin(6\alpha)$$

$$C_{46b} = D\sin(6\alpha + 180)$$

where C equals the axial position of the pattern along a circumferential reference axis 48, D equals the peak value of the distance of the pattern from the circumferential reference axis 48, and α equals the mechanical angle in degrees. The number six is the spatial frequency of the patterns, with each pattern undergoing a 360° phase change every sixty mechanical degrees. The patterns repeat every sixty mechanical degrees, corresponding to the number of rotor poles 34 of the motor 26.

FIGS. 6A and 6B depict a scale of mechanical degrees of the ring 40 and a scale of electrical degrees of the ring 40, respectively. FIG. 6C illustrates the sinusoidal patterns of the conductive electrical tracks 46a and 46b. The two conductive electrical tracks 46a and 46b have first connection terminals 50 and 52, respectively. A common connection terminal 54 joins the other connection terminal of the tracks. As a result, the instantaneous current in conductive electrical track 46a is in a direction opposite to that in track 46b. The effect of the two circumferentially varying sinusoidal patterns is a well defined instantaneous magnetic flux pattern of alternating positive and negative potentials in the respective areas bounded by the two conductor patterns.

In accordance with one embodiment of the present invention, the transmitting ring 40 is made from a powdered iron toroid. The two grooves 39a and 39b are machined in the outer surface 41 of the toroid to form the sinusoidal patterns previously described. A wire is laid in each of the grooves to form the conductive electrical tracks 46a and 46b. The grooves 39a and 39b are slightly tapered in an inward radial direction to hold the wires therein. In addition, an adhesive is applied to secure the wires in place. One of the groove depths is greater than the other to avoid pressure at the intersection points of the two wires. In this embodiment, it is desirable to keep the wires as close to the surface of the ring 40 as possible to assure a well-defined magnetic pattern is transmitted.

In accordance with an alternative embodiment of the present invention, the transmitting ring 40 includes conductors 46a and 46b secured to the outer surface 41 of the ring 40 in the sinusoidal pattern through electroplating, plasma deposition, sputtering methods, or other similar techniques known to those skilled in the art. The deposition of the conductors in this embodiment must be done sequentially. An insulating layer must first be deposited on the ring 40, followed by one of the sinusoidal conductor patterns, then a second insulating layer, and finally the second sinusoidal conductor pattern. Alternatively, a single layer deposition can be used if an insulated bridge is provided for one of the sinusoidal conductors at each of the intersections or cross over locations between the two conductors.

Another alternative embodiment of the transmitting ring 40 utilizes a two layer flexible linear circuit. The sinusoidal pattern is created on a two layer flexible linear circuit board having a mean length which fits around the circumference of the ring 40. The flexible linear circuit is then bonded to the outer surface 41 of the ring 40 using adhesive methods known to those skilled in the art.

Yet, another alternative embodiment of the transmitting ring 40 is shown in FIG. 7. In this embodiment, a transmitting ring 40' is made of a moldable soft ferrite material with a plurality of radially raised, foot-ball shaped, lands or bobbins 50. The radially raised bobbins 50 form a border for sinusoidal patterns similar to the patterns described above. Each radially raised bobbin 50 is referred to as a pole. An insulated wire 52 is wound around the poles in a first direction, following a sine pattern, around the entire circumference of the ring 40'. The insulated wire is then wound around the poles in the other direction following a 180° shifted sine pattern to the original starting terminal. The number of windings of the insulated wire may be repeated to yield an increased turns ratio. The outer diameter d3 of the raised pole ring 40' must be less than the inner diameter d2 of a receiving ring 42 to insure an air gap between the transmitting ring and the receiving ring.

There are several benefits that result from the FIG. 7 embodiment of the transmitter ring 40'. First, the raised pole design allows for manufacture through low cost molding techniques, and is readily producible in large volumes. The raised poles also allow for the use of conventional winding techniques in mounting the wire on the transmitter ring 40', resulting in further cost advantages. Finally, the raised poles provide a magnetically focused field area and, therefore, improve the efficiency of the transmitting ring 40'.

The receiving ring 42 is mounted to the motor stator 28 and, in turn, housing 36 in a coaxial relationship with the transmitting ring 40 so that the transmitting ring 40 is nested inside of the receiving ring 42. The radial proximity of the ring 40 and ring 42 provides electromagnetic coupling therebetween so as to form a rotary transformer 57.

The receiving ring 42 has a plurality of parallel conductive tracks 53 cut into its inner surface 54. A plurality of receiving coils 55 are wound in these tracks. Specifically, the receiving coils 55, in accordance with one embodiment of the present invention, comprises three sets of coils 56a, 56b, and 56c each of which are wound in associated tracks 53a, 53b, and 53c with each of the coils being insulated from one another and from the ring 42.

Each of the coils 56a, 56b, and 56c is arranged in a circumferentially varying square wave pattern, separated from each of the other patterns by thirds so as to be offset by 120° electrical degrees (20° mechanical) from the other two patterns. Every sixty mechanical degrees, the patterns repeat.

Referring to FIGS. 6D, 6E, and 6F, the outputs of each of the coils 56a, 56b, and 56c are depicted. These coils form square wave patterns. The conductive coil 56a has a connection terminal 58. The coils 56b and 56c have, respectively, connection terminals 60 and 62. The coils 56a, 56b, and 56c have a common connection terminal 64.

The slots 53 are circumferentially narrow and radially shallow to assure a sharp delineation of the magnetic field transmitted by the transmitting ring 40. There are thirty-six circumferentially equidistant slots, that is, one slot every 10°. In a preferred embodiment, the coils 56a, 56b, and 56c are each made with wire positioned in the slots 53 with a wire being placed in every third slot. The wire for coil 53a is placed in one slot 56a, runs along the edge of ring 42 until it reaches the next slot 53a where it runs up that next slot. The wire 56a, in effect, forms a square wave pattern in slots 53a around the entire circumference of ring 42. The same is true for coils 56b and 56c in their associated slots 53b and 53c, respectively. The wires in the slots relative to the transmitter windings is shown in FIGS. 6D-6F.

If a higher received signal strength is desired, the wire pattern shown in FIG. 6G can be used for each of the tracks. The dotted line corresponds to a return wire and effectively increases the turns ratio of the coil formed by the wire, thereby increasing the strength of the signal received by that coil.

Figure 8:
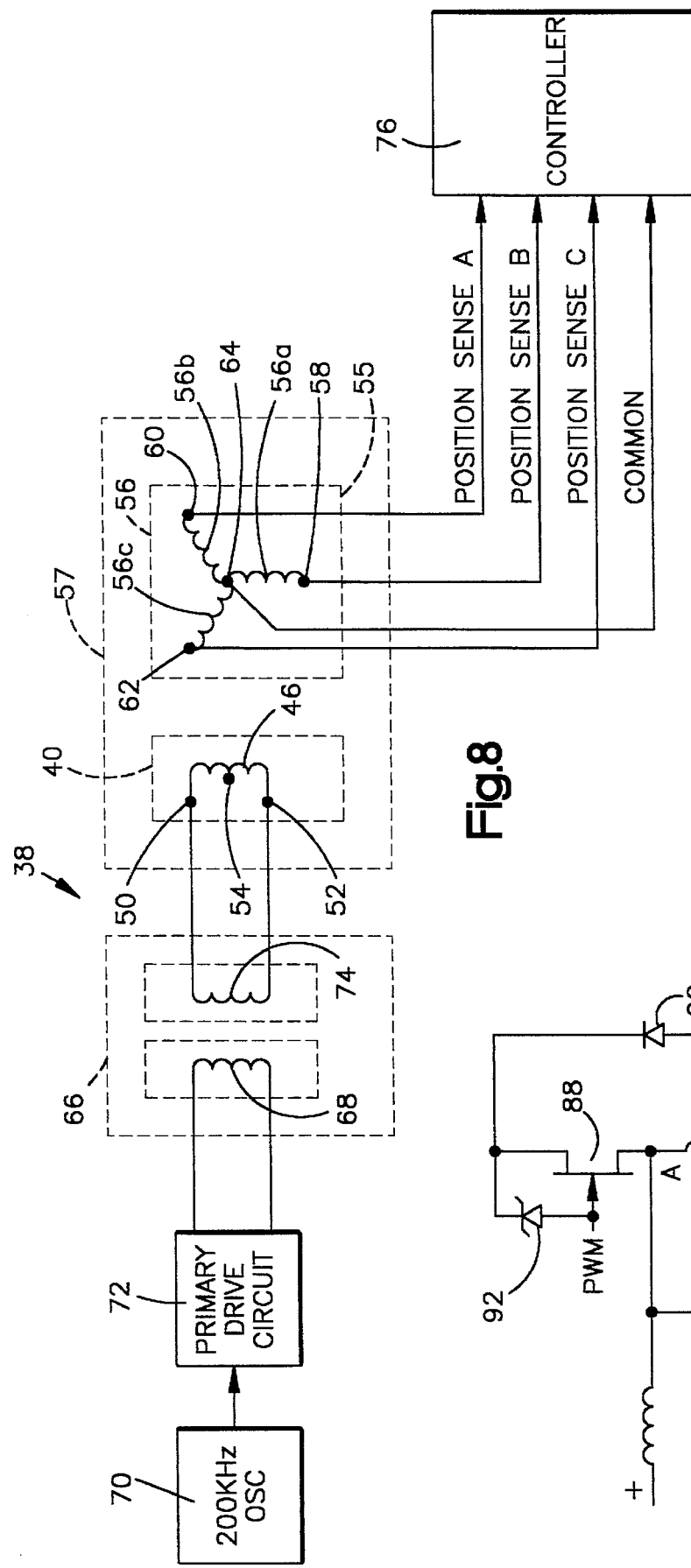
FIG. 8 is a schematic circuit diagram for the rotor position sensor shown in FIG. 1.

Referring to FIG. 4, the signal from the receiving coils 56 is accessible though stationary contacts 58, 60, 62 since the receiving ring 42 is secured to the stator 36. Since the transmitting ring 40 is secured to the rotor 32, the coil 46 is energized through a rotary transformer arrangement 66 (as shown in FIG. 8). A primary coil 68 is secured to the stator 28 (housing 36) and is electrically connected through terminals 67, 69. A secondary coil 74 is secured to the rotor 32 and is electrically connected to the transmitting coil 46 through terminals 50, 52 (FIG. 8). The primary coil 68 and secondary coil 74 are in sufficiently close proximity to each other so as to form a rotary transformer.

Referring to FIG. 8, the primary coil 68 is electrically connected to a signal generator 70 through a primary drive circuit 72. The drive signal applied to the rotary transformer 66 is a sinusoidal drive signal. The transmitting coil 44 of the transmitting ring 40 is driven with the 200 kHz sinusoidal drive signal from the primary drive circuit 72. The receiving coil 56 outputs a sinusoidal signal in response to the electromagnetic field transmitted by the transmitting coil 46. Specifically, the coils 56a, 56b, 56c will each output a sinusoidal signal. In other words, each of the coils 56a, 56b, and 56c is itself a receiving coil. The sinusoidal signals from the receiving coils are electro-mechanically offset from each other by 120 electrical degrees. The output signal from the receiving coils can be expressed as:

$$V1 = v\sin(\omega t)\sin(\alpha + 0)$$

$$V2 = v\sin(\omega t)\sin(\alpha + 120)$$

$$V3 = v\sin(\omega t)\sin(\alpha + 240)$$

where $\Omega$ is the drive circuit frequency, $\alpha$ is the shaft angle in electro-mechanical degrees, t is the present time. The equations represent the value of the voltage present across the associated coil. The voltage V1 is the voltage across the coil 56a formed in track 53a, and V2 and V3 are the voltages across the coils 56b and 56c formed by the tracks 53a and 53b, respectively.

The output of each receiving coil 56 goes through six cycles (360 electrical degrees) for each 360 mechanical degrees of relative rotation between the transmitting ring 40 and the receiving ring 42, or, equivalently, between the rotor 32 and the stator 28. If the output of each receiving coil were to be observed, the output voltage amplitudes would follow a sine wave pattern and end at its starting terminal each ⅙th of a relative rotation between the stator 28 and the rotor 32. Therefore, the voltage at the output of each receiving coil goes through 360 electrical degrees for each 60 degrees of mechanical rotation between the rotor 32 and the stator 28.

The equations for V1, V2, and V3 provide three equations with three unknowns. As the transmitting ring 40 rotates relative to the receiving ring 42, such as occurs when the rotor 32 moves relative to the stator 28, the values output from the three receiving coils vary. A controller 76 monitors the values output by each of the receiving coils 56. The controller 76 is preferably a microprocessor or microcomputer. At any instant in time t, the controller 76 can measure the value of the voltage present at the outputs of the receiving coils and solve the equations for $\alpha$. The solution of the equations for $\alpha$ represents the rotary position of the motor rotor 32 relative to the stator 28 or to the motor housing 36. Knowing the position of the rotor 32 relative to the stator 28 permits the controller 76 to control commutation of the motor 26.

Referring back to FIG. 1, a shaft position sensor 78 is operatively connected across the input shaft 16 and the output shaft 17 and provides an electrical signal having a value indicative of the relative rotational position between the input shaft 16 and the output shaft 17. The shaft position sensor 78 in combination with the torsion bar 18 form a torque sensor 80. The output of the torque sensor 80 is indicative of the applied steering torque to the vehicle steering wheel 12 by the vehicle operator.

The output of the torque sensor 80 is connected to the controller 76. The controller 76 processes the torque signal provided by the torque sensor 80, and determines, in one of the many methods known in the art, a torque command value therefrom. Preferably, the torque command signal is determined in accordance with the process described in the above-incorporated U.S. Pat. No. 5,257,828 to Miller et al. The torque command value determines the amount of torque to be generated by the motor 26. From the torque command value and the position of the rotor 32 of the motor 26, the controller 76 controls the energization of the motor 26 in terms of sequence and current applied to the stator coils through a power drive switches 82.

Figure 9:
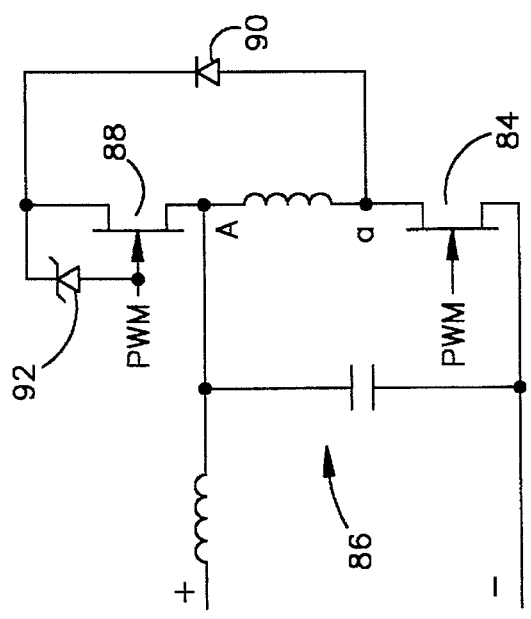
FIG. 9 is a circuit schematic of the power switch shown in FIG. 1.

A typical power switch 82 for the pair of stator coils Aa is shown in FIG. 9. A main drive switch 84 is operatively connected between one side of the stator coil and electrical ground. The other side of the coil pair Aa is connected to the vehicle battery through a filter network 86. Current control is accomplished by the controller 76 pulse-width-modulating ("PWM") the main drive switch 84. The controller 76 further controls switching of a switch 88 which is connected in parallel with the stator coil pair through a series connected diode 90. The switch 88 provides a return of energy when the coil pair Aa is de-energized. Zener diode 92 provides a current return path. Those skilled in the art will appreciate that other drive circuits may be used.

Commutation or drive pulses from the controller 76 may need to be output to the stator windings at a rate faster than the motor position data can be processed from the sensor 38 to insure smooth operation of the variable reluctance motor. To solve this problem, it is preferable that the position of the rotor 32 be estimated at predetermined times between actual rotor position measurements based upon certain known conditions and certain assumptions. Rotor position estimation is described in an IEEE paper entitled "A Simple Motion Estimator For VR Motors" by W. D. Harris and J. H. Lang, IEEE Industry Applications Society Annual Meeting, October 1988 and in a paper entitled "A State Observer for Variable Reluctance Motors: Analysis and Experiments" by A Lumsdaine, J. H. Lang, and M. J. Balas, 19th ASILOMAR Conference on Circuits, Systems & Computers, Nov. 6–8, 1985, both papers being incorporated herein by reference.

From the above description of the invention, those skilled in the art will perceive improvements, changes and modifications. Such improvements, changes and modifications within the skill of the art are intended to be covered by the appended claims.

Having described the invention, the following is claimed:

1. An apparatus for sensing the relative rotational position between first and second relatively rotatable members, comprising:

a transmitting ring being mountable to said first member, said transmitting ring having a transmitting coil mounted thereon and arranged in a circumferentially varying sinusoidal pattern; and a receiving ring being mountable to said second member so that said transmitting ring and said receiving ring are concentric, said receiving ring having a receiving coil mounted thereon and arranged in a pattern so as to receive a signal from said transmitting ring and output a signal indicative of the relative rotational position between said first and second members.

2. The apparatus of claim 1 wherein said receiving coil is arranged in a circumferentially varying square wave pattern.

3. The apparatus of claim 1 wherein said receiving coil includes three conductor patterns, each of the patterns being electrically insulated from each other pattern.

4. The apparatus of claim 3 wherein each conductor pattern is offset from an adjacent pattern by 120 electrical degrees.

5. The apparatus of claim 1 further including a rotary coupling transformer operatively mounted between a stationary member and said first member, said first member rotating relative to said stationary member, a primary coil of said rotary coupling transformer being electrically connectable to a sinusoidal drive signal, a secondary coil of said rotary coupling transformer being electrically connected to said transmitting coil for providing a drive signal to said transmitting coil.

6. The apparatus of claim 1 wherein said transmitting coil extends around the entire circumference of said transmitting ring.

7. The apparatus of claim 1 wherein said transmitting ring includes two separate layers of conductor patterns, each pattern being arranged in the form of a circumferentially varying sinusoid, with the two patterns electrically insulated from each other and offset from each other by 180 electrical degrees.

8. The apparatus of claim 1 wherein said transmitting ring and said receiving ring are made from a material having a magnetic permeability greater than one.

9. The apparatus of claim 1 wherein said transmitting ring has a machined groove in the form of said circumferentially varying sinusoidal pattern with said transmitting coil mounted in said machined groove.

10. The apparatus of claim 1 wherein said transmitting ring has a plurality of radially extending poles in the form of said circumferentially varying sinusoidal pattern with said transmitting coil wound around said radially extending poles.

11. The apparatus of claim 1 wherein said transmitting coil arranged in a circumferentially varying sinusoidal pattern is formed on a flexible linear circuit, said flexible linear circuit being mounted to said transmitting ring.

12. An apparatus for sensing the relative rotational position between a stator and a rotor in a variable reluctance motor, comprising:

a transmitting ring mounted so as to be stationary relative to one of said stator and rotor, said transmitting ring having a transmitting coil mounted thereon and arranged in a circumferentially varying sinusoidal pattern; and a receiving ring mounted so as to be stationary relative to the other of said stator and rotor so that said transmitting ring and said receiving ring are concentric, said receiving ring having a receiving coil mounted thereon and arranged in a pattern so as to receive a signal from said transmitting ring and output a signal indicative of the relative rotational position of said stator and rotor.

13. The apparatus of claim 12 wherein said receiving coil is arranged in a circumferentially varying square wave pattern.

14. The apparatus of claim 12 wherein said receiving coil includes three conductor patterns, each of the patterns being electrically insulated from each other pattern.

15. The apparatus of claim 14 wherein each conductor pattern is offset from an adjacent pattern by 120 electrical degrees.

16. The apparatus of claim 12 wherein said transmitting ring is secured to said rotor and wherein said apparatus further includes a rotary coupling transformer operatively mounted between said stator and said rotor, a primary coil of said rotary coupling transformer being electrically connectable to a sinusoidal drive signal, a secondary coil of said rotary coupling transformer being electrically connected to said transmitting coil for providing a drive signal to said transmitting coil.

17. The apparatus of claim 12 wherein said transmitting coil extends around the entire circumference of said transmitting ring.

18. The apparatus of claim 12 wherein said transmitting ring includes two separate layers of conductor patterns, each pattern being arranged in the form of a circumferentially varying sinusoid, with the two patterns electrically insulated from each other and offset from each other by 180 electrical degrees.

19. A method for sensing the relative rotational position between first and second relatively rotatable members, comprising the steps of:

(a) providing a transmitting ring;

(b) securing a transmitting coil to said transmitting ring in a circumferentially varying sinusoidal pattern;

(c) mounting said transmitting ring to one of said first and second members;

(d) providing a receiving ring;

(e) securing a receiving coil to said receiving ring in a pattern so as to receive a signal from said transmitting ring and output a signal indicative of the relative rotational position of said first and second members; and (f) mounting said receiving ring to the other of said first and second members.

20. The method of claim 19 wherein said step of securing said receiving coil to said receiving ring includes securing three conductor patterns and electrically insulating each conductor pattern from adjacent conductor patterns, and securing said conductor patterns to said receiving ring so that the patterns are electrically offset from each other by 120°.

21. A method for sensing the relative rotational position between a stator and a rotor in a variable reluctance motor, comprising the steps of:

(a) providing a transmitting ring;

(b) securing a transmitting coil to said transmitting ring in a circumferentially varying sinusoidal pattern;

(c) mounting said transmitting ring to one of said stator and rotor;

(d) providing a receiving ring;

(e) securing a receiving coil to said receiving ring in a pattern so as to receive a signal from said transmitting ring and output a signal indicative of the relative rotational position of said stator and rotor; and (f) mounting said receiving ring to the other of said stator and rotor.

* * * * *